United States Patent [19]

Reid

[11] Patent Number: 5,391,436
[45] Date of Patent: Feb. 21, 1995

[54] METAL CASING WITH POLYURETHANE THERMAL BREAK

[75] Inventor: Kevin J. Reid, White Bear, Minn.

[73] Assignee: H. B. Fuller Licensing & Financing, Inc., Wilmington, Del.

[21] Appl. No.: 72,248

[22] Filed: Jun. 7, 1993

Related U.S. Application Data

[63] Continuation of Ser. No. 869,389, Apr. 16, 1992, abandoned.

[51] Int. Cl.⁶ .............................................. B32B 15/04
[52] U.S. Cl. ............................. 428/423.1; 428/425.5; 428/425.8; 428/425.9; 428/447; 428/457; 428/913
[58] Field of Search ................... 428/402, 423.1, 425.8, 428/447, 457, 425.5, 425.9, 913

[56] References Cited

U.S. PATENT DOCUMENTS

| | | | |
|---|---|---|---|
| 4,335,218 | 6/1982 | DeGuiseppi | 521/99 |
| 4,520,071 | 5/1985 | Noda et al. | 428/402 |
| 4,588,803 | 5/1986 | Christman | 528/78 |
| 4,605,725 | 8/1986 | Christman | 528/77 |
| 5,102,923 | 4/1992 | Porosoff et al. | 521/159 |
| 5,137,788 | 8/1992 | Clatty et al. | 428/457 |

FOREIGN PATENT DOCUMENTS

| | | |
|---|---|---|
| 3645025 | 12/1986 | Germany . |
| 2080378 | 2/1982 | United Kingdom . |
| 2196369 | 4/1988 | United Kingdom . |
| 2197657 | 5/1988 | United Kingdom . |

*Primary Examiner*—Stevan A. Resan
*Attorney, Agent, or Firm*—Vidas, Arrett & Steinkraus

[57] ABSTRACT

Metal casing structures for windows, doors frames and the like which employ a cured polyurethane thermal break produced from a liquid curable formulation catalyzed by certain tertiary amines, especially a diazabicyclic compound, between respective interior and exterior facing segments of the casing have much greater resistance to debonding of the break on thermal cycling than do casings manufactured using prior art formulations catalyzed with metal compounds.

13 Claims, 2 Drawing Sheets

METAL CASING WITH POLYURETHANE THERMAL BREAK

This is a continuation of application Ser. No. 07/869,389, filed on Apr. 16, 1992, now abandoned.

BACKGROUND OF THE INVENTION

Extruded metal exterior window and door casing, generally made of aluminum are widely used in construction of all kinds and particularly in office and industrial buildings. Such metal casings are extremely good thermal conductors and therefore can cause considerable heat loss in winter and heat gain in summer in a building in which they are installed. To reduce this problem it is becoming conventional to employ a "thermal break" between the interior and the exterior portions of a metal casing. The thermal break is made of a material of relatively low thermal conductivity and serves to interrupt the transfer of heat between the interior and exterior metal portions.

Conventional process from manufacturing a thermal break is to provide a metallic casing extrusion with a central top opening channel into which a liquid curable polymer formulation is poured and cured. After curing the bottom of the channel is milled off so as to break the continuity of the extrusion, leaving a cured solid polymer intermediate segment bonded between two separate metal segments. It also conventional to use curable polyurethane catalyzed with a metal catalysts such as dibutyltin dilaurate as the liquid curable polymer material.

In use such polyurethane thermal breaks are subjected to high stresses caused by day, night and seasonal thermal cycling of the metal segments which have much higher thermal expansion coefficients than the polyurethane thermal break. Further, these stresses are different on each side of the break due to differential interior and exterior temperatures. Consequently, it is not uncommon for the break to debond from the metal segments of the casing resulting in a loss of structural integrity.

There is therefore a need for a metal casing structure having a polyurethane thermal break which displays improved structural integrity upon thermal cycling.

SUMMARY OF THE INVENTION

The invention hereof is based upon the surprising discovery that casings employing polyurethane thermal breaks produced from a liquid curable formulation catalyzed by certain tertiary amines, especially a diazabicyclic compound, have much greater resistance to debonding of the break on thermal cycling than do casings manufactured using prior art formulations catalyzed with metal compounds.

The invention hereof, therefore, is the novel metal casing structures for windows, doors frames and the like which employ an cured polyurethane thermal break between respective interior and exterior facing segments wherein the polyurethane is a cured polyol/polyisocyanate formulation employing a tertiary amine catalyst.

DESCRIPTION OF THE PREFERRED EMBODIMENTS

Figure 1:
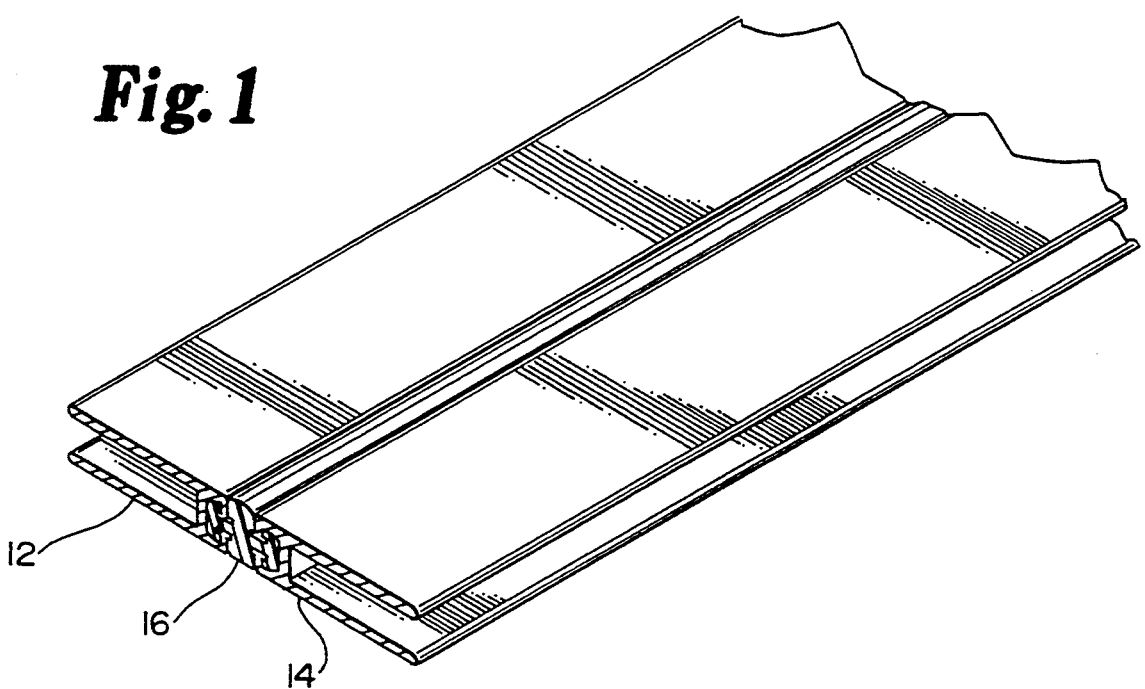
FIG. 1 shows a perspective view of a window casing segment of the invention including a central thermal break.

Referring first to FIG. 1 there shown therein a casing segment 10 comprising an external facing metal portion 12 and an exterior facing portion 14 separated by a central polyurethane thermal break 16. In the embodiment illustrated in FIG. 1 the interior and exterior portions, 12, 14, are identical, however it will be understood by those in the art these portions may be different from each other and may be configured to many other shapes than the shape depicted in the Figure.

Figure 2:
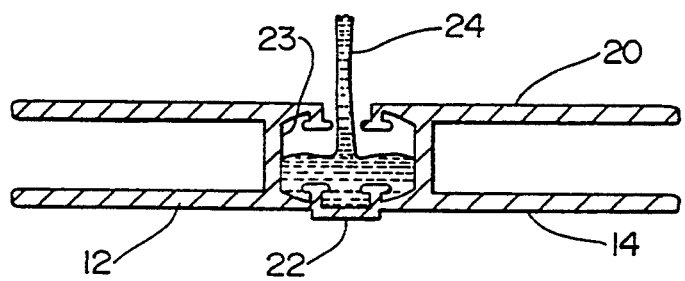
FIG. 2 is a sectional view of a metal extrusion having a central channel into which a liquid polymer forming composition is being added to form a thermal break.
Figure 3:
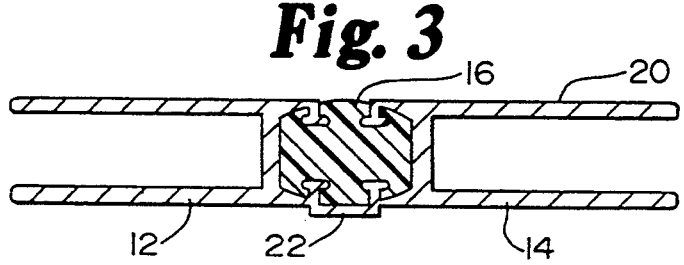
FIG. 3 is a sectional view of the extrusion as in FIG. 2 with the thermal break material cured in place.
Figure 4:
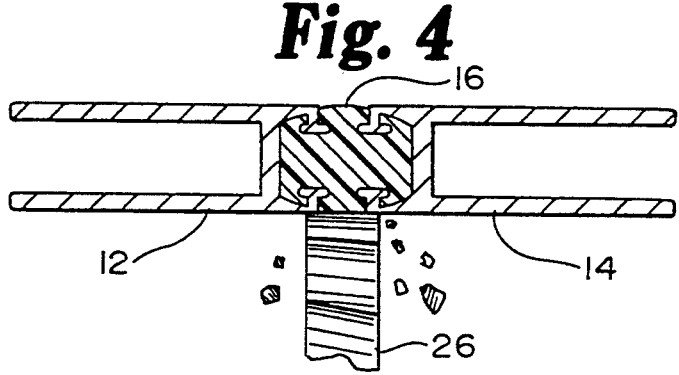
FIG. 4 is a sectional view as in FIGS. 2 and 3 the channel bottom of the extrusion is being milled off to form the window casing segment of FIG. 1.

FIGS. 2-4 illustrate the process of manufacturing the metal casing of FIG. 1. In particular, in FIG. 2 there is shown a unitary extrusion 20 comprising the respective interior and exterior portions 12, 14, casing 10, connected by a bridge portion 22. Together the three portions of the extrusion 20 define a central channel 23 into which a mixed and catalyzed curable two-part liquid polyurethane formulation 24 is poured. After channel 23 has been filled the liquid formulation cures to the solid polymer 16 shown in FIG. 3.

In FIG. 4, a mill 26 is shown removing bridge 22 so as to break the connection between the interior and exterior portions of extrusion 20 and thereby to form the casing of FIG. 1.

In the prior process for manufacturing such metal casing with polyurethane thermal breaks, a metal compound, such as dibutyltin dilaurate, stannous octoate zinc octoate, and the like, or mixtures thereof, have been used as cure catalysts. As illustrated in Example 6, when tested by removing the cured polymer from the extrusion channel and subjecting the resulting polymer block to repeated thermal cycling, polymer blocks formed using prior art metal compound catalyzed polyurethane formulations show substantially no change in dimension. However, when the entire casing is subjected to the same thermal cycling conditions, the thermal break portion of the casing produced from such a prior formulation tindergoes substantial linear shrinkage which can result in debonding of the polymer from the adjacent metal segment.

In contrast, if the same composition is used except that the metal compound catalyst is replaced by a tertiary amine selected from the group consisting of diazabicyclo- and triazabicyclo-alkanes and alkenes and N-(3-dimethylamino)propyl-N,N',N'-trimethyl-1,3-propanediamine, the resulting thermal break segment of the casing displays much reduced linear shrinkage on thermal cycling. Example 5 illustrates this surprising result. Thus, casing structures of the invention are much more resistant to structural weakening due to debonding.

With the exception of the catalyst, the liquid polyurethane forming compositions utilized in the invention may be any two-part polyol/polyisocyanate formulation otherwise suitable for the application. It is preferred that the polyol portion of the formulation be a mixture of polyols having a high proportion of tetra functionality to provide a strong crosslinked cured polymer. Suitably, the polyols are those having backbones of polyether or polyester and molecular weights in the range of 62 to 6500. To provide effective crosslinking the polyol mixture should provide an average of 2.0-4.0 hydroxyl groups per molecule.

The polyisocyanate portion of the formulation is suitably a polymer extended multi-isocyanate, the extended polymer providing an average of about 2-2.7 isocyanate groups per molecule. Example polyisocyanates useful in the invention are sold under the trademarks Papi 2027 by Dow Chemical and Mondur MR by Mobay, respectively. A preferred example has a molecular weight of 132. Non-polymeric plural isocyanate compounds, such as toluene diisocyanate and isophorone diisocyanate, may also be used. The crosslink density, Me, of the composition is desirably in the range of about 550-680, preferably about 580-620.

The tertiary amine catalyst is suitably a diazobicyclo- or triazobicyclo-alkane or alkene such as 1,4-diazobicyco-2,2,-octane, 1,8-cliazobicyclo-5,4,0-undec-7-ene, 1,5-diazobicyclo-4,3,0-non-5-ene, or 1,5,7-triazabicyclo-4,4,0-dec-5-ene. The acylic tertiary triamine N-(3-dimethylamino)propyl-N,N',N'-trimethyl-1,3-propanediamine is also suitable.

The preferred formulations also include other ingredients which lower shrinkage or enhance bonding to metallic substrates. Examples of such materials are soft fillers such as calcined clay or mica, hard fillers such as glass fibers, wollastonite and ceramic fibers, hydrophobic silicas and glass beads. Silane coupling agents such as glycidoxypropyltrimethoxysilane are also desireably included.

Typical filler levels are 5-30% with soft fillers preferred. Silanes are suitably employed at levels of 0.5-2.0 parts, preferably 1 part, by weight per 100 parts of filler.

The invention is illustrated by the following non-limiting examples.

Example 1 (Comparative Example)

The following polyols were charged in a three neck, round bottom flask and mixed: triethylene glycol (Dow Chemical) 875 grams, Voranol 240-440 polyether-tetraol (Dow Chemical) 467 grams, Voranol 230-112 polyether-triol (Dow Chemical) 603 grams, Voranol 230-238 polyether-triol (Dow Chemical) 389 grams, Voranol 236-026 polyether-triol (Dow Chemical) 1555 grams. The following pigments and catalysts were added: Neptune Black X60 (BASF) 5 grams, Zinc Hex-Chem 22% (Mooney Chemical) 3.9 grams and Metacure MT-1 (Air Products) 0.8 grams. The mixture was blended under vacuum at 70° C. until moisture content was below 0.04% (Karl Fisher titration). 100 Grams of this mixture was hand mixed with 80 gram Papi 2027 polyisocyanate (Dow Chemical), yielding a pot life of 20 seconds.

Example 2

The following polyols catalysts and pigments were mixed according to the procedure in Example 1: triethylene glycol 874 grams, Voranol 240-770 465 grams, Voranol 230-238 388 grams, Voranol 230-112 602 grams, Voranol 236-026 1513 grams, Neptune Black X60 5.9 grams and Dabco 33LV (1,4-diazabicyclo[2.2.-2]octane) 12.1 grams. A 100 gram sample was hand mixed with 80 grams of Papi 2027, yielding a 40 second pot life.

Example 3 (Comparative Example)

The following polyols, catalysts and pigments were mixed according to the procedure in Example 1: triethylene glycol 856 grams, Voranol 240-770 603 grams, Voranol 230-238 389 grams, Voranol 230-112 642 grams, Voranol 236-026 1399 grams, Neptune Black X60 5.9 grams, Metacure MT-1 (Air Product) 4.6 grams and Metacure T-12 0.4 grams. A 100 grams sample was hand mixed with 87 grams Papi 2027, yielding a 15 second pot life.

Example 4

The following polyols, catalysts and pigments was mixed according to procedure in Example 1: triethylene glycol 854.6 grams, Voranol 240-770 602 grams, Voranol 230-238 388 grams, Voranol 230-112 641 grams, Voranol 236-026 1396.6 grams, Neptune Black X60 5.9 grams and Dabco 33LV 12.1 grams. A 100 grams sample was hand mixed with 87 grams Papi 2027 yielding a 43 second pot life.

Example 5

The products of Examples 1-4, while still liquid, were poured into the central channel of a bronze anodized aluminum extrusion as shown in FIG. 2, having a length of 76.2 cm (30 inches) and allowed to harden. After milling the bridge 22 forming the bottom of the channel, the resulting casing structures were subjected to repeated thermal cycles of 3 hours at −40° C. (−40° F.), heating to 71° C. (160° F.) over 2 hours at a constant rate and then holding at 71° C. for 3 hours and then cooling to −40° C. (−40° F.) over 2 hrs.

The lengths of the thermal breaks were measured at intervals of 30, 60 and 90 cycles and the % shrinkage from the original length determined. From the results given in Table 1 it can be seen that the thermal breaks of the invention (Examples 2 and 4) shrunk substantially less than did those made from corresponding formulations employing a metal compound catalyst (Examples 1 and

TABLE 1

| Example | Catalyst type* | Cycles | | |
|---|---|---|---|---|
| | | 30 | 60 | 90 |
| 1 (comparative) | M | 3.7% | 5.8% | 8.2% |
| 2 | A | 1.7% | 1.8% | 2.1% |
| 3 (comparative) | M | 2.0% | 3.7% | 5.1% |
| 4 | A | 0.3% | 2.3% | 3.6% |

*M = Metal, A = Amine

Figure 5:
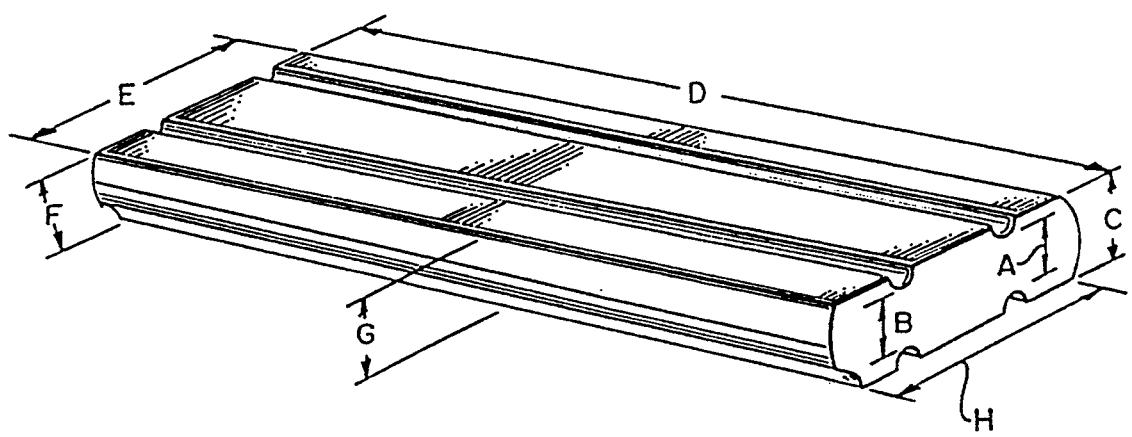
FIG. 5 is a perspective of a portion of a cured thermal break, prepared as shown in FIG. 2, which has been removed from the channel for physical testing of the cured polymer.

A polymer block was prepared by pouring a mixed formulation of Example 1 into an extrusion channel and curing as shown in FIGS. 2 and 3. The cured polymer block was then tapped out of the channel to provide a cured polymer block as shown in FIG. 5. Dimensions as labeled in FIG. 5 were measured and then the block was subjected to thermal cycling as described in Example 5 for 210 cycles. The results shown in Table 2 show that the block remained dimensionally stable outside the confinement of the aluminum casing segments.

TABLE 2

| CYCLES | MEASURED RELATIVE DIMENSIONS | | | | | | | |
|---|---|---|---|---|---|---|---|---|
| | A | B | C | D | E | F | G | H |
| 0 | 0.234 | 0.224 | 0.372 | 4.855 | 0.876 | 0.366 | 0.388 | 0.877 |
| 30 | 0.231 | 0.226 | 0.368 | 4.854 | 0.876 | 0.366 | 0.399 | 0.876 |

TABLE 2-continued

| CYCLES | MEASURED RELATIVE DIMENSIONS | | | | | | | |
|---|---|---|---|---|---|---|---|---|
| | A | B | C | D | E | F | G | H |
| 60 | 0.231 | 0.224 | 0.371 | 4.853 | 0.876 | 0.364 | 0.398 | 0.876 |
| 90 | 0.228 | 0.225 | 0.375 | 4.852 | 0.876 | 0.365 | 0.395 | 0.876 |
| 120 | 0.229 | 0.224 | 0.371 | 4.854 | 0.876 | 0.370 | 0.398 | 0.877 |
| 150 | 0.227 | 0.223 | 0.368 | 4.853 | 0.876 | 0.370 | 0.398 | 0.876 |
| 210 | 0.227 | 0.227 | 0.362 | 4.853 | 0.876 | 0.371 | 0.398 | 0.876 |

Example 7

The following polyols, catalysts, fillers and pigments were mixed according to procedure in Example 1: triethylene glycol 744, grams, Voranol 240-770 396.6 grams, Voranol 230-238 329.5 grams, Voranol 230-112 512.5 grams, Voranol 236-026 1322 grams, Neptune Black X60 5.1 grams, Cab-O-Sil TS-610 19.5 grams, Kaolin (Snow Tex 45) 550 grams and Dabco 33LV 15.6 grams. A 100 grams sample was hand mixed with 68 grams Papi 2027, yielding a 40 second pot life.

Example 8

The following polyols, catalysts, fillers and pigments were mixed according to procedure in Example 1: triethylene glycol 744 grams, Voranol 240-770 396.6 grams, Voranol 230-238 329.5 grams, Voranol 230-112 512.5 grams, Voranol 236-026 1322 grams, Neptune Black X60 5.1 grams, Cab-O-Sil TS-610 19.5 grams, Dabco 33LV 15.6 grams and Zeospheres 200 (Zeelan Corp) 550 grams. A 100 grams sample was hand mixed with 68 grams Papi 2027, yielding a 40 second pot life.

Example 9

The following polyols, catalysts, filler and pigments were mixed according to procedure in Example 1: triethylene glycol 744 grams, Voranol 240-770 396.6 grams, Voranol 230-238 329.5 grams, Voranol 230-112 512.5 grams, Voranol 236-026 1322 grams, Neptune Black X60 5.1 grams, Cab-O-Sil TS-610 19.5 grams, Mica 3X (Mineral Mining Corp. S. Carolina) 550 grams and Dabco 33LV 15.6 grams. A 100 grams sample was hand mixed with 68 grams Papi 2027, yielding a 40 second pot life.

Example 10

The following polyols, catalysts, filler and pigments were mixed according to procedure in Example 1: triethylene glycol 744 grams, Voranol 240-770 396.6 grams, Voranol 230-238 329.5 grams, Voranol 230-112 512.5 grams, Voranol 236-026 1322 grams, Neptune Black X60 5.1 grams, Trans Link 555 (0.8 micron Kaolin with amino silane treatment, Engel-Hard Corp.) 569.5 grams and Dabco 33LV 11.7 grams. A 100 grams sample was hand mixed with 68 grams Papi 2027, yielding a 45 second pot life.

Example 11

The following polyols, catalysts, filler and pigments were mixed according to procedure in Example 1: triethylene glycol 744 grams, Voranol 240-770 396.6 grams, Voranol 230-238 329.5 grams, Voranol 230-112 512.5 grams, Voranol 236-026 1322 grams, Neptune Black X60 5.1 grams, Cab-O-Sil TS-610 19.5 grams, Kaolin (Snow Tex 45) 550 grams, glycidoxypropyltrimethoxysilane 5.9 grams and Dabco 33LV 11.7 grams. A 100 grams sample was hand mixed with 68 grams Papi 2027, yielding a 38 second pot life.

Example 12

The following polyols, catalysts, filler and pigments were mixed according to procedure in Example 1: triethylene glycol 744 grams, Voranol 240-770 396.6 grams, Vorano 230-238 329.5 grams, Voranol 230-112 512.5 grams, Voranol 236-026 1322 grams, Neptune Black X60 5.1 grams, Cab-O-Sil TS-610 19.5 grams, Mica 3X 550 grams, glycidoxypropyltrimethoxysilane 5.9 grams and Dabco 33LV 15.6 grams. A 100 grams sample was hand mixed with 68 grams Papi 2027, yielding a 40 second pot life.

Example 13

The following polyols, catalysts, filler and pigments were mixed according to procedure in Example 1: triethylene glycol 744 grams, Voranol 240-770 396.6 grams, Voranol 230-238 329.5 grams, Voranol 230-112 512.5 grams, Voranol 236-026 1322 grams, Neptune Black X60 5.1 grams, Cab-O-Sil TS-610 19.5 grams, Zeospheres 200 550 grams, glycidoxypropyltrimethoxysilane 5.9 grams and Dabco 33LV 15.6 grams. A 100 grams sample was hand mixed with 68 grams Papi 2027, yielding a 40 second pot life.

Example 14

The following polyols, catalysts, filler and pigments were mixed according to procedure in Example 1: triethylene glycol 744 grams, Voranol 240-770 396.6 grams, Voranol 230-238 329.5 grams, Voranol 230-112 512.5 grams, Voranol 236-026 1322 grams, Neptune Black X60 5.1 grams, Kaolin (Sno-Tex 45) grams, Cab-O-Sil TS-720 19.5 grams, (3-aminopropyl)trimethoxysilane 5.9 grams and Dabco 33LV 15.6 grams. A 100 grams sample was hand mixed with 68 grams Papi 2027, yielding a 42 second pot life.

Example 15

The following polyols, catalysts, filler and pigments were mixed according to procedure in Example 1: triethylene glycol 744 grams, Voranol 240-770 96.6 grams, Voranol 230-238 329.5 grams, Voranol 230-112 512.5 grams, Voranol 236-026 1322 grams, Neptune Black X60 5. 1 grams, Kaolin (Snow-Tex 45) grams, Cab-O-Sil TS-720 19.5 grams, (3-mercaptopropyl)-trimethoxysilane 5.9 grams and Dabco 33LV 15.6 grams. A 100 grams sample was hand mixed with 68 grams Papi 2027, yielding a 40 second pot life.

Example 16

The following polyols, catalysts, filler and pigments were mixed according to procedure in Example 1: Voranol 232-034 1265.6 grams, Stepanol PS-3152 (Stephan Chemical Co.) 545.6 grams, Voranol 230-238 1168.4 grams dipropylene glycol 338.9 grams, Diethylene glycol 401 grams, ethylene glycol 124.8 grams, Dabco 33 LV 46.4 grams, Neptune Black X 60 5.9 grams. A 100 grams sample was hand mixed with 91 grams PAPI 2027, yielding a 30 second pot life.

Example 17

The procedure of Example 5 was repeated using the formulations of Example 7 -15. Results, shown in the Table 3, show the effect of various filler and coupling agent combinations on the shrinkage of the thermal brake portions of the inventive casing structures. From the Table it can be seen that optimal performance is obtained when the preferred fillers and coupling agents are utilized in conjunction with the amine catalyst in the invention.

TABLE 3

| Example | Filler Type | Coupling Agent | Cycles | | |
|---|---|---|---|---|---|
| | | | 30 | 60 | 90 |
| 7 | Kaolin | none | 1.3% | 1.4% | 2.3% |
| 8 | Glass beads | none | 5.0% | 8.7% | — |
| 9 | Mica | none | 4.6% | 9.8% | — |
| 10 | Kaolin pretreated w/ amino silane | none | 3.4% | 4.7% | — |
| 11 | Kaolin | Glycidyl silane | 0.2% | 1.2% | 1.7% |
| 12 | Mica | Glycidyl silane | 0.2% | 2.7% | 6.3 |
| 13 | Glass beads | Glycidyl silane | >0.1% | 0.3% | 1.5% |
| 14 | Kaolin | Amino silane | 2.8% | 3.9% | 4.3% |
| 15 | Kaolin | Mercapto silane | 0.9 | 2.2% | 2.6% |

Table 4 illustrates the effect of crosslink density, Mc, on the formulations of the invention.

TABLE 4

| Example | Mc | Cycles | | |
|---|---|---|---|---|
| | | 30 | 60 | 90 |
| 2 | 669.8 | 1.7 | 1.8 | 2.1 |
| 16 | 840.5 | 1.5 | 8.3 | 14.7 |

This completes the description of the preferred and alternate embodiments of the invention. Those skilled in the art may recognize other equivalents to the specific embodiment described herein which equivalents are intended to be encompassed by the claims attached hereto.

What is claimed is:

1. A metal casing comprising a formed-in-place polyurethane thermal break wherein the polyurethane has been formed from a polyol/polyisocyanate mixture which has been catalyzed by a tertiary amine selected from the group consisting of 1,4-diazabicyclooctane and N-(3-dimethylamino)propyl-N,N',N'-trimethyl-1,3-propanediamine, the mixture formulated for a crosslink density, M, in the range of about 550–680.

2. A metal casing as in claim 1 wherein the tertiary amine is 1,4-diazabicyclooctane.

3. A metal casing as in claim 1 wherein the tertiary amine is N-(3-dimethylamino)propyl-N,N',N'-trimethyl-1,3-propanediamine.

4. A metal casing as in claim 1 wherein the metal is aluminum or an alloy thereof.

5. A metal casing as in claim 1 wherein the polyol portion of said formulation is a mixture of plural hydroxyl functional compounds including a tetra functional polyol.

6. A metal casing as in claim 5 wherein the polyisocyanate portion of the formulation is a polymer extended multi-isocyanate providing an average of about 2.0–2.7 isocyanate groups per molecule.

7. A metal casing as in claim 1 further comprising between 5 and 30% by weight of a filler.

8. A metal casing as in claim 7 wherein the filler is selected from the group consisting of calcined clay, mica, glass fibers, wollastanite, ceramic fibers, hydrophobic silicas, and glass beads.

9. A metal casing as in claim 7 further comprising a silane coupling agent.

10. A metal casing as in claim 9 wherein said silane is present at a level of 0.5–2.0 parts per 100 parts of filler.

11. A metal casing as in claim 10 wherein said silane is glycidoxypropyltrimethoxysilane.

12. A casing for a building exterior window or door comprising interior and exterior having aluminum or aluminum alloy metal segments separated by a bonded polymeric thermal barrier segment formed inplace bypolymerization of a polyisocyanate/polyol mixture, the mixture further including an effective amount of a catalyst selected from the group consisting of 1,4-diazobicyclooctane and N-(3-dimethylamino)propyl-N,N',N'-trimetheyl-1,3-propanediamine; between 5 and 30% by weight of a soft filler selected from the group consisting of calcined clay, mica and mixtures thereof; and, between 0.5 and 2.0% of a silane coupling agent, the mixture formulated for a crosslink density, $M_c$, in the range of about 550–680.

13. A casing as in claim 12 wherein the polyisocyanate/polyol mixture is formulated for a crosslink density, $M_c$, in the range of about 580–620.

* * * * *